(12) United States Patent
Getty

(10) Patent No.: US 8,112,331 B2
(45) Date of Patent: Feb. 7, 2012

(54) SYSTEM AND METHOD FOR PROVIDING LIQUIDITY

(75) Inventor: Gordon P. Getty, San Francisco, CA (US)

(73) Assignee: ReFlow Services, LLC, San Francisco, CA (US)

( * ) Notice: Subject to any disclaimer, the term of this patent is extended or adjusted under 35 U.S.C. 154(b) by 1482 days.

(21) Appl. No.: 10/092,005

(22) Filed: Mar. 6, 2002

(65) Prior Publication Data

US 2003/0172019 A1    Sep. 11, 2003

(51) Int. Cl.
*G06Q 40/00* (2006.01)
(52) U.S. Cl. .......................................... 705/35
(58) Field of Classification Search .............. 705/35–40, 705/36 R, 36 T
See application file for complete search history.

(56) References Cited

U.S. PATENT DOCUMENTS

| | | | |
|---|---|---|---|
| 5,101,353 A | | 3/1992 | Lupien et al. |
| 5,806,048 A | * | 9/1998 | Kiron et al. ................ 705/36 R |
| 5,878,405 A | | 3/1999 | Grant et al. |
| 5,933,815 A | | 8/1999 | Golden |
| 6,134,535 A | | 10/2000 | Belzberg |
| 6,289,321 B1 | | 9/2001 | Suganuma |
| 6,317,728 B1 | | 11/2001 | Kane |
| 6,338,047 B1 | | 1/2002 | Wallman |
| 7,035,820 B2 | * | 4/2006 | Goodwin et al. ................ 705/37 |
| 7,136,833 B1 | | 11/2006 | Podsiadlo |
| 7,249,075 B1 | * | 7/2007 | Altomare et al. ................ 705/35 |
| 2001/0042033 A1 | | 11/2001 | Sposito |
| 2001/0042037 A1 | | 11/2001 | Kam et al. |
| 2001/0049650 A1 | | 12/2001 | Moshal et al. |
| 2003/0074300 A1 | * | 4/2003 | Norris ............................. 705/37 |
| 2003/0083972 A1 | * | 5/2003 | Williams ........................ 705/36 |

OTHER PUBLICATIONS

Korea Herald. "Critics say government's market stabilization policy short-sighted". Seoul: Jan. 26, 2000. (3 pages).*
PCT Search Report for US03/06822 dated Jul. 7, 2003.
Webster's II New College Dictionary, Houghton Mifflin Company, 2001, p. 1244.
PCT Notification of Transmittal of the International Preliminary Examination Report for Counterpart PCT Application No. PCT/US03/06822 mailed Apr. 14, 2004, 4 pgs.
Office Action for Japanese Patent Application No. 2003-575321 mailed Feb. 9, 2007, 9 pgs. (including English Translation).
Office Action for Japanese Patent Application No. 2003-575321 mailed Nov. 15, 2007, 11 pgs. (including English Translation).
Office Action for Canadian Patent Application No. 2,478,279 mailed Aug. 14, 2006, 5 pgs.
Office Action for Canadian Patent Application No. 2,478,279 mailed Apr. 17, 2009, 4 pgs.
Office Action for Canadian Patent Application No. 2,478,279 mailed May 25, 2010, 5 pgs.

* cited by examiner

*Primary Examiner* — Thu-Thao Havan
*Assistant Examiner* — Greg Pollock
(74) *Attorney, Agent, or Firm* — Blakely, Sokoloff, Taylor & Zafman LLP

(57) ABSTRACT

A computer-implemented method of providing liquidity to an investment fund utilizing a liquidity vehicle, including determining that the investment fund has a net share outflow, prompting the investment fund having a net share outflow to offer shares to the liquidity vehicle, purchasing an offered share, holding the purchased share in the liquidity vehicle for a period of time, and redeeming the purchased share from the investment fund in response to a net inflow of shares of the investment fund.

20 Claims, 2 Drawing Sheets

SYSTEM AND METHOD FOR PROVIDING LIQUIDITY

The present invention relates to providing liquidity to investment vehicles.

Open end management investment companies, commonly known as mutual funds, and certain other investment funds, suffer from a need to maintain an adequate level of liquidity inter alia to meet investor redemption requests. Maintaining a sufficiently large sum of cash to meet anticipated requests and other liquidity needs is costly because such funds are not invested in investments other than commercial paper of very short maturity and the like, which tends to reduce the ability of the investment fund to obtain high returns from investing in profitable opportunities identified by the fund. The investment fund may be able to borrow funds to meet its liquidity needs, but such borrowing can be expensive. Selling underlying investments to liquidate sufficient funds can also be expensive due to the brokerage costs of buying and selling shares, the tax costs passed on to investors of liquidating appreciated shares, lack of liquidity where the size of an investment owned by an investment fund is very large or where the investment is in an illiquid asset, and the risk that the investment fund may need to liquidate funds during a temporary market or sector downturn at a loss and repurchase the same investments at higher prices a few days later.

There is therefore a need for a liquidity vehicle permitting investment funds to meet its liquidity needs without selling the underlying investments of the investment fund.

SUMMARY OF THE INVENTION

In one embodiment, the invention relates to a method of providing liquidity to an investment fund utilizing a liquidity vehicle, including prompting at least one investment fund having a net share outflow to offer shares to the liquidity vehicle, purchasing at least one offered share, and holding the at least one purchased share in the liquidity vehicle for a period of time.

In one embodiment, the invention relates to a system for providing liquidity to an investment fund utilizing a liquidity vehicle, including a processor, a memory in communication with the processor, a display in communication with the processor, and an input device in communication with the processor, wherein the processor prompts at least one investment fund having a net share outflow to offer shares to the liquidity vehicle, the processor causes at least one offered share to be purchased, and the processor causes the at least one purchased share in the liquidity vehicle to be held for a period of time.

In one embodiment, the invention relates to a system for providing liquidity to an investment fund utilizing a liquidity vehicle, including means for prompting at least one investment fund having a net share outflow to offer shares to the liquidity vehicle, means for purchasing at least one offered share, and means for holding the at least one purchased share in the liquidity vehicle for a period of time.

In one embodiment, the invention relates to a computer-readable medium having stored thereon computer-executable instructions for performing steps including prompting at least one investment fund having a net share outflow to offer shares to the liquidity vehicle, purchasing at least one offered share, and holding the at least one purchased share in the liquidity vehicle for a period of time.

DETAILED DESCRIPTION OF THE INVENTION

The following terms shall have, for the purposes of this application, the respective meanings set forth below.

Investment fund: Any fund that holds securities for the benefit of one or more investors holding shares in the fund, including but not limited to open and closed end management investment companies, mutual funds, unit investment trusts, and face amount certificate companies.

Liquidity vehicle: Within the meaning of the present application, an entity that provides liquidity to an investment fund by temporarily acquiring a beneficial interest in the investment fund.

Net share outflow; Net share inflow: A net share outflow over any given period of time is the excess of the number of shares of an investment fund redeemed by investors other than the liquidity vehicle over the number of shares of that investment fund purchased by investors other than the liquidity vehicle. Conversely, a net share inflow over any given period of time is the excess of the number of shares of an investment fund purchased by investors other than the liquidity vehicle over the number of shares of that investment fund redeemed by investors other than the liquidity vehicle.

Share: A share, for the purposes of the present application, is any fractional beneficial interest in an investment fund, whether or not denominated in units referred to as "shares".

Figure 1:
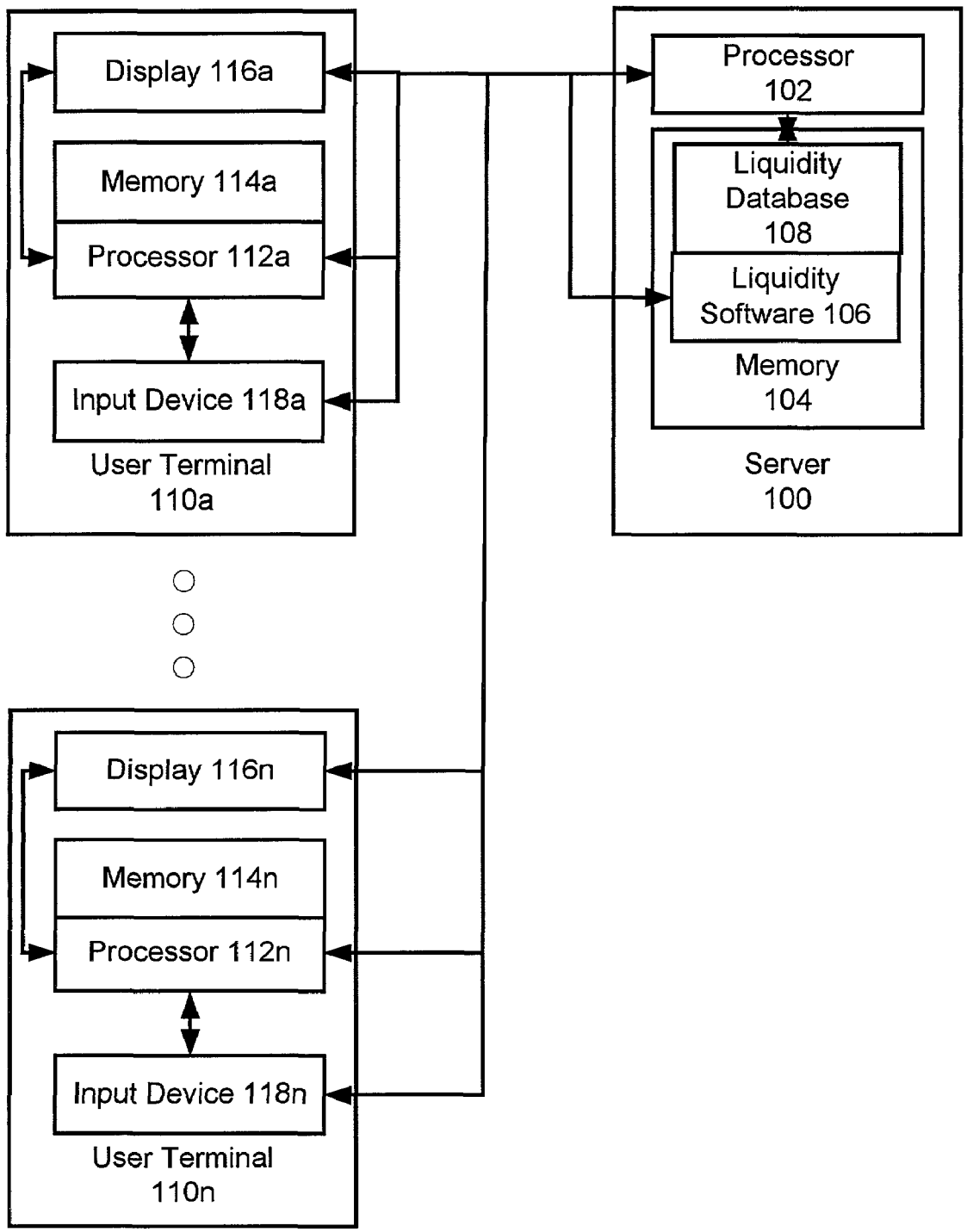
FIG. 1 illustrates a system in accordance with an embodiment of the present invention.

Referring to FIG. 1, a system in accordance with an embodiment of the present invention is illustrated. Server 100 can be a mainframe, minicomputer, microcomputer (such as a personal computer or workstation), or other computing device, or a plurality of computing devices connected together by a network, such as an ethernet work, or by other means, running an operating system such as a version of Microsoft Windows or a version of Unix, but is typically a risc-based midrange Sun server running Sun Solaris (Unix), such as a Sun Enterprise 250 running Solaris 8. Server 100 includes processor 102, which can be a risc-based processor (or Pentium or better x86 processor) and memory 104 connected to processor 102. Memory 104 can be any form of temporary memory, such as random access memory, or permanent storage, such as a hard drive, but is typically a continuation of both. Stored in memory 104 is liquidity software 106 and liquidity database 108.

Server 100 is in communication with a plurality of user terminals 110a through 110n over the Internet, another network, or other connection. User terminals 110a through 110n can be mainframe computers, minicomputers, microcomputers (such as personal computers or workstations), dumb terminals, network computers, personal digital assistants, or other computing devices. In some embodiments, user terminals 110a through 110n are of dissimilar types. For example, user terminal 110a might be a personal computer in communication with server 100 over the Internet, user terminal 110b might be a personal digital assistant in communication with server 100 over the Internet, and user terminal 110c might be a dumb terminal that is in communication with server 100 over a network other than the Internet. Each of user terminals 110a through 110n includes at least display 116 and input device 118 and can include a processor 112 and a memory 114. Display 116 can be a cathode ray tube monitor, liquid crystal display, or other type of display. Input device 118 can be a keyboard, keypad, mouse, trackball, or other type of device for inputting data. Moreover, display 116 and input device 118 can be a single combined element, such as a touchscreen. In some embodiments hereunder, a representative of an investment fund can provide a bid to a representative of the liquidity vehicle, orally or otherwise, and the representative of the liquidity vehicle can enter the bid into server 100 or user terminal 110. In such embodiments, such oral or other provision of bids can be the sole or an alternative method of communicating bids.

Liquidity software 106 in an exemplary embodiment includes a user interface, preferably a graphical user interface, and methods or functions for (i) prompting an investment fund to offer shares to the liquidity vehicle and to specify any terms of the offer that are negotiable (such as the amount of the fee to be charged for the liquidity service), (ii) determining (through a dutch auction or otherwise) which investment fund or funds are to have shares purchased by the liquidity vehicle and how many, (iii) determining when to redeem shares previously purchased by the liquidity vehicle and how many, and (iv) providing information to each investment fund regarding the bids that it has submitted, purchases consummated, the number of shares currently held by the liquidity vehicle, and redemptions, among many other methods or functions. Investment software 106 can be written in an object oriented language such as C++ or Java, a procedural language such as C, or other language.

Liquidity database 108 can be an off the shelf or custom relational, object oriented, or other database. In some embodiments, liquidity database 108 can include or consist of one or more flat files, such as spreadsheet or word processing files. In an exemplary embodiment, liquidity database 108 is an Oracle 8i relational database. Liquidity database 108 stores one or more categories of data, including, but not limited to the following:

(i) data relating to each investment fund that has registered to receive liquidity services, such as one or more of the fund's name, a contact name, address, telephone number, e-mail address, taxpayer identification number, username, and password, an internal client identification number, the current net asset value of the fund, the current number of shares of the fund held by the liquidity vehicle, and any outstanding bids of the fund;

(ii) data relating to net asset values of investment funds;

(iii) data relating to standing or one time bids of investment funds, including but not limited to the number of shares offered and the fee offered;

(iv) data relating to net share inflows and outflows, including the number of shares purchased or redeemed by investors other than the liquidity vehicle;

(v) current holdings of the liquidity vehicle; and (vi) data relating to a custodial bank to and from which funds are transferred in connection with each purchase or redemption of shares, such as the bank's name, address, telephone number, and ABA routing number, the name of a contact at the bank, and the account numbers of accounts associated with investment funds that have registered to use the present invention.

In different embodiments of the present invention, a greater or lesser number of the above categories of data can be included in liquidity database 108 and other categories of data not enumerated above can be included. Liquidity database 108 can consist of a single database or a plurality of databases. Moreover, in an embodiment such as the exemplary embodiment, utilizing a relational database each category of information that is present can consist of one or a plurality of related tables.

Figure 2:
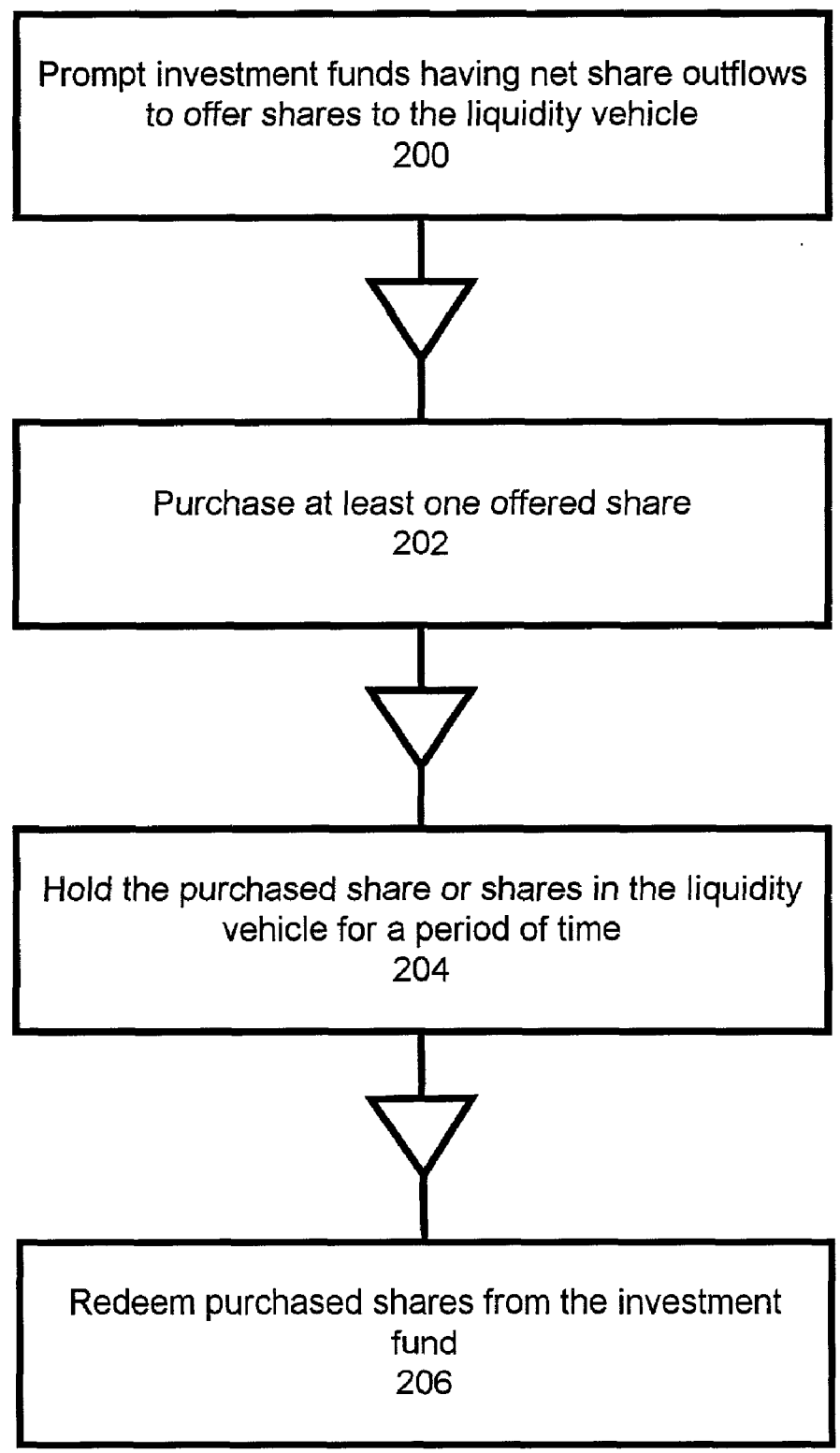
FIG. 2 is a flowchart illustrating a method in accordance with an embodiment of the present invention.

Referring to FIG. 2, a method in accordance with the present invention is illustrated. The illustrated method allows investment funds to sell a number of shares not exceeding the net number of shares redeemed by investors to a liquidity vehicle, which then ordinarily redeems the shares when investors make net purchases of the same investment funds, thereby eliminating or mitigating the need for an investment fund to sell its underlying assets during a temporary shortage of funds caused by share redemptions. The liquidity vehicle receives a fee, directly or indirectly, for providing such services. Prior to step 200, an investment fund can optionally be prompted to register online over the Internet, by postal mail, by telephone, or by other means. Registration can include providing information such as one or more of the fund's name, a contact name, address, telephone number, e-mail address, taxpayer identification number, username, password, and account number at a custodial account, as well as other information and can include the investment fund agreeing to terms relating to the provision of liquidity services, such as the basis for determining fees to be charged and the number of offered shares purchased, limitations on liability, and other provisions. In the exemplary embodiment, the steps of the method illustrated in FIG. 2 are performed over the World Wide Web ("Web"); however, in other embodiments, the steps can be performed by other means, such as oral transmission of bids (either in person or over telephone lines), manual calculation of auction results, etc.

In step 200, the liquidity vehicle prompts at least one investment fund to offer at least one share of the fund to the liquidity vehicle. The liquidity vehicle can so prompt an investment fund by providing a Web site including a page for submitting offers to sell shares to the liquidity vehicle include text entry data controls for entering the number of shares desired to be sold and the fee that the investment fund is willing to pay to obtain liquidity in this manner (expressed in the exemplary embodiment as a percentage of the value of the shares to be sold). The shares offered by the investment fund cannot exceed the excess of the net share outflow over a period of time over the net shares purchased by the liquidity vehicle over the same period of time. In some embodiments the liquidity software automatically calculates that number. In the exemplary embodiment, only the net share inflow or outflow of the previous trading day is considered; accordingly, previous purchases and redemptions of the liquidity vehicle are not considered.

In the exemplary embodiment, the investment fund is prompted to enter either a standing bid, which will automatically be entered with respect to the net share outflow on any trading day when no bid cancellation is received, or a one-time bid. In other embodiments a greater or lesser number of types of bids can be utilized.

Either as a part of step 200 or a separate step, investment funds can optionally be prompted over the Web or otherwise to enter data relating to its net asset value at the close of each trading day and its net share inflow or outflow on each trading day and to correct any errors detected in such information previously submitted. In an exemplary embodiment, investment funds can be prompted to enter such data by means of an e-mail message automatically sent to the investment fund. This e-mail message can be automatically sent every day or can be automatically sent each day that the net asset value and net share inflow or outflow data is not entered by a previously specified time (the time either being specified by the liquidity vehicle to apply to all investment funds or by each investment fund to meet its data entry practices and needs).

In step 202, the liquidity vehicle purchases shares offered in step 200. In the exemplary embodiment, the liquidity software utilizes a dutch auction to determine which fund or funds that has offered shares in step 200 will have shares purchased from it or them, how many, and the amount or amounts of the fees to be charged. Specifically, with respect to each dutch auction, a set dollar amount is available for investment in one or more investment funds and a minimum fee in percentage terms is optionally set. The liquidity software ranks each offer of shares by the size of the fee offered in percentage terms (i.e., a one percent fee ranks higher than a half percent fee even if the total fee in absolute dollar terms if all offered shares were purchased would be greater with respect to the half percent fee). With respect to the highest bid, the liquidity software accepts as much of the bid as can be accepted without exceeding the set dollar amount for that auction. If any portion of the set dollar amount is unused for the highest bid, that portion is then used progressively to accept as much of the next highest bid until no portion of the set dollar amount remains. If two or more investment funds submit bids with identical fees, equal dollar amounts of each such tying bid are accepted until no portion of the set dollar amount remains. The fee charged to each investment fund having an accepted or partially accepted bid is the lowest prevailing percentage bid. In other embodiments, however, fixed fees, other forms of auctions, or other algorithms are utilized.

The liquidity software in the exemplary embodiment automatically purchases shares in accordance with the results of the dutch auction. In other embodiments, however, the results can be provided to a human for entry of purchases by telephonic or other means. In the exemplary embodiment, each investment fund that offered shares with respect to a particular auction receives an e-mail message following the auction informing it that an auction has been held and that the results can be seen on a specified Web page.

In step 204, any shares purchased from an investment fund are held for a period of time. In the exemplary embodiment, that period of time is ordinarily the period during which there is no net share inflow (if there is a net share inflow, but the net share inflow is smaller in quantity than the size of the block of shares currently held by the liquidity vehicle, the period of time can be longer with respect to the excess shares). When there is a net share inflow on any day in the exemplary embodiment, a number of previously purchased shares equal to that net share inflow will be redeemed. For example, if on day one there is a net share outflow of 50,000 shares and 25,000 shares are purchased by the liquidity vehicle, on day two there is a net share outflow of 10,000 shares and no shares are purchased by the liquidity vehicle, on day three there is a net share inflow of 30,000 shares, on day four there is a net share inflow of 10,000 shares, and on day five there is a net share inflow of 80,000 shares, the liquidity vehicle would redeem 25,000 shares on day three.

In other embodiments of the present invention, intervening net share outflows can be taken into account. For example, if on day one there is a net share outflow of 50,000 shares and 25,000 shares are purchased by the liquidity vehicle, on day two there is a net share outflow of 10,000 shares and no shares are purchased by the liquidity vehicle, on day three there is a net share inflow of 30,000 shares, on day four there is a net share inflow of 10,000 shares, and on day five there is a net share inflow of 80,000 shares, in a first alternative embodiment the liquidity vehicle could redeem 5,000 shares on day four and 20,000 shares on day five. The above examples of methods of computing net share inflows and outflows and the number of shares to be repurchased on specific dates are only particular examples of the vast multiplicity of possible methods and the present invention is not limited to the two illustrated methods.

In step 206 in the exemplary embodiment, redemptions are entered automatically by the liquidity software, but in other embodiments, redemptions can be entered by an officer of the liquidity vehicle using telephonic means or by other means.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

That which is claimed is:

1. A computer-implemented method of providing liquidity utilizing a liquidity vehicle, comprising:
   receiving, by a computer server, registration information from an investment fund wanting to receive liquidity services from the liquidity vehicle for meeting financial obligations resulting from the redemption of at least one share of the investment fund;
   determining, by the computer server, that the registered investment fund has a net share outflow, wherein the net share outflow comprises the registered investment fund having an excess number of shares being redeemed, excluding shares redeemed by the liquidity vehicle, in comparison to a number of shares being purchased, excluding shares purchased by the liquidity vehicle, over a predetermined amount of time;
   prompting, by the computer server in response to the determination that the registered investment fund has a net share outflow, the registered investment fund to offer shares to the liquidity vehicle;
   purchasing, by the computer server, at least one offered share of the registered investment fund with proceeds of the purchase going to the registered investment fund;
   holding, by the computer server, the at least one purchased share in the liquidity vehicle for a period of time; and
   redeeming, by the computer server, at least one of the at least one purchased share from the registered investment fund in response to a net inflow of shares of the registered investment fund.

2. The method of claim 1, wherein the computer server is a liquidity vehicle server.

3. The method of claim 1, wherein the computer server is a third party server.

4. The method of claim 1, wherein the at least one offered share is purchased prior to a next trading day after an occurrence of an outflow of shares of the registered investment fund.

5. The method of claim 4, wherein the redeeming is performed prior to a next trading day following an occurrence of an inflow of shares of the registered investment fund.

6. The method of claim 4, wherein the redeeming is performed within five trading days of an occurrence of an inflow of shares of the registered investment fund on a trading day.

7. The method of claim 1, wherein a fee is charged by the liquidity vehicle in connection with the purchase of the at least one offered share.

8. The method of claim 7, wherein the fee is determined through an auction.

9. The method of claim 7, wherein the fee is determined through a Dutch auction.

10. The method of claim 7, wherein the fee is determined by the liquidity vehicle.

11. The method of claim 1, wherein a fee is charged by an entity other than the liquidity vehicle in connection with the purchase of the at least one offered share.

12. The method of claim 1, wherein the period of time for holding the at least one purchased share does not exceed a period between the purchase of the at least one share by the liquidity vehicle and a date by which the at least one registered investment fund has experienced a net share inflow following the purchase equal to at least the number of shares purchased by the liquidity vehicle.

13. The method of claim 1, wherein the period of time for holding the at least one purchased share does not exceed a predetermined number of days more than a period between the purchase of the at least one share by the liquidity vehicle and a date by which the at least one registered investment fund has experienced a net share inflow following the purchase equal to at least the number of shares purchased by the liquidity vehicle.

14. A system for providing liquidity utilizing a liquidity vehicle, comprising:
   a processor; and
   a memory in communication with said processor, the memory storing instructions, which when executed by the processor cause the system to
   store in the memory registration information from an investment fund wanting to receive liquidity services for meeting financial obligations resulting from the redemption of at least one share of the investment fund from the liquidity vehicle;
   determine that the registered investment fund has a net share outflow, wherein the net share outflow comprises the registered investment fund having an excess number of shares being redeemed, excluding shares redeemed by the liquidity vehicle, in comparison to a number of shares being purchased, excluding shares purchased by the liquidity vehicle, over a predetermined amount of time;
   in response to the determination that the registered investment fund has a net share outflow, prompt the registered investment fund to offer shares to the liquidity vehicle;
   cause at least one offered share of the at least one registered investment fund to be purchased by the liquidity vehicle with proceeds of the purchase going to the investment fund;
   cause the at least one purchased share in the liquidity vehicle to be held for a period of time; and
   wherein the period of time for holding the at least one purchased share does not exceed a period between the purchase of the at least one share by the liquidity vehicle and a date by which the at least one registered investment fund has experienced a net share inflow following the purchase equal to at least the number of shares purchased by the liquidity vehicle.

15. The system of claim 14, wherein a fee is charged by the liquidity vehicle in connection with the purchase of the at least one offered share, wherein the fee is determined through an auction.

16. A system for providing liquidity utilizing a liquidity vehicle, comprising:
   means for registering with the liquidity vehicle an investment fund wanting to receive liquidity services for meeting financial obligations resulting from the redemption of at least one share of the investment fund;
   means for determining that the registered investment fund has a net share outflow, wherein the net share outflow comprises the registered investment fund having an excess number of shares being redeemed, excluding shares redeemed by the liquidity vehicle, in comparison to a number of shares being purchased, excluding shares purchased by the liquidity vehicle, over a predetermined amount of time;
   means for prompting, in response to the determination that the registered investment fund has a net share outflow, the registered investment to offer shares to the liquidity vehicle;
   means for purchasing by the liquidity vehicle at least one offered share of the at least one registered investment fund with proceeds of the purchase going to the at least one registered investment fund;
   means for holding the at least one purchased share in the liquidity vehicle for a period of time; and
   wherein the period of time for holding the at least one purchased share does not exceed a period between the purchase of the at least one share by the liquidity vehicle and a date by which the at least one registered investment fund has experienced a net share inflow following the purchase equal to at least the number of shares purchased by the liquidity vehicle.

17. The system of claim 16, further comprising:
   means for performing an auction to determine a fee to be charged by the liquidity vehicle in connection with the purchase of the at least one offered share.

18. A computer-readable storage medium having stored thereon computer-executable instructions to cause a computer to perform a method comprising:
   registering, with a liquidity vehicle, an investment fund wanting to receive liquidity services for meeting financial obligations resulting from the redemption of at least one share of the investment fund;
   determining that the registered investment fund has a net share, wherein the net share outflow comprises the registered investment fund having an excess number of shares being redeemed, excluding shares redeemed by the liquidity vehicle, in comparison to a number of shares being purchased, excluding shares purchased by the liquidity vehicle, over a predetermined amount of time;
   prompting, in response to the determination that the registered investment fund has a net share outflow, the registered investment fund to offer shares to the liquidity vehicle;
   purchasing, for the liquidity vehicle, at least one offered share of the at least one registered investment fund with the proceeds of the purchase going to the at least one registered investment fund;
   holding the at least one purchased share in the liquidity vehicle for a period of time; and
   redeeming at least one of the at least one purchased share from the at least one registered investment fund in response to an occurrence of a net inflow of shares of the registered investment fund.

19. The computer-readable storage medium of claim 18, wherein a fee is charged by the liquidity vehicle in connection with the purchase of the at least one offered share, wherein the fee is determined through an auction.

20. The computer-readable storage medium of claim 18, wherein the period of time for holding the at least one purchased share does not exceed a period between the purchase of the at least one share by the liquidity vehicle and a date by which the at least one registered investment fund has experienced a net share inflow following the purchase equal to at least the number of shares purchased by the liquidity vehicle.

* * * * *